United States Patent [19]

Robinson, Sr.

[11] Patent Number: 4,856,228

[45] Date of Patent: Aug. 15, 1989

[54] TUNNEL SYSTEM FOR CARE OR SEEDS, PLANTS AND THE LIKE

[76] Inventor: Clell Robinson, Sr., 2262 SE. 150th St., Summerfield, Fla. 32691

[21] Appl. No.: 129,871

[22] Filed: Dec. 4, 1987

Related U.S. Application Data

[63] Continuation of Ser. No. 796,294, Nov. 8, 1985, abandoned.

[51] Int. Cl.$^4$ ............................................ A01G 13/04
[52] U.S. Cl. .................................................... 47/29
[58] Field of Search .................... 47/28.1, 28 A, 28 R, 47/29, 48.5, 79

[56] References Cited

U.S. PATENT DOCUMENTS

| | | | |
|---|---|---|---|
| 2,752,928 | 7/1956 | Barker | 47/28.1 |
| 2,782,794 | 2/1957 | White | 47/28.1 |
| 2,812,769 | 11/1957 | Schaefer et al. | 47/28 A |
| 2,910,994 | 11/1959 | Joy | 47/28 A |
| 3,206,892 | 9/1965 | Telkes et al. | 47/29 |

FOREIGN PATENT DOCUMENTS

| | | | |
|---|---|---|---|
| 1075888 | 2/1960 | Fed. Rep. of Germany | 47/28.1 |
| 2153253 | 5/1973 | Fed. Rep. of Germany | 47/28 A |
| 2504352 | 10/1982 | France | 47/28 R |

Primary Examiner—Robert A. Hafer
Assistant Examiner—Charles H. Sam
Attorney, Agent, or Firm—Witherspoon & Hargest

[57] ABSTRACT

An air supported tunnel system for protecting soil rows of planted items by providing a cover thereover, the tunnel system includes a tunnel cover adapted to extend cover a longitudinally extending soil row, the covering being of plastic material and defining a tunnel of generally semi-circular cross section; a plurality of longitudinally spaced air ribs integral with the cover and extending from end to end of the cross section of the cover acts as tunnel supports when inflated; an air channel is connected to the tunnel cover along one side thereof, said air channel being in fluid commumincation with each air rib whereby pressurized air may be supplied through said air channel to inflate the air ribs to maintain the tunnel system in erected condition; a water ballast assembly connected to each longitudinal side of the tunnel cover, the water ballast assembly including a water channel connected to the longitudinal side of the cover, a plurality of ballast chambers in fluid communications with each water channel whereby water may be fed through the water channel into each ballast chamber so as to maintain the tunnel cover in place over the row of planted items.

5 Claims, 2 Drawing Sheets

TUNNEL SYSTEM FOR CARE OR SEEDS, PLANTS AND THE LIKE

This application is a continuation, of application Ser. No. 796,294, filed 11-8-85, now abandoned.

BACKGROUND AND SUMMARY OF THE INVENTION

This invention is directed to apparatus for protecting seeds, plants and the like from unfavorable climatic conditions. By so doing, the seed, plants and the like are generally stimulated into rapid fertilization and growth.

As in most commercial endeavors the costs of the apparatus used in producing a product is a main consideration and possibly a major portion of the overall cost. This is particularly true in the area of growing various types of plants for food purposes. It is most desirable that the farmer take all precautions possible to make certain that adverse climatic conditions do not literally wipe out his crops. Greenhouses go a long way in providing insurance against bad weather condition. Unfortunately, the cost of producing on a greenhouse basis almost immediately raises costs to unacceptable limits. As in most instances there are compromises what go toward solving the major portion of the bad weather problem. Such is a tunnel system adapted to cover and protect whatever may be planted in the land therebeneath.

The concept of employing various types of portable coverings such as tunnels and the like is not new. However, there are problems encountered in the use of plant tunnels in farm work. Plastics of translucent, or non translucent material are readily available at what appears to be reasonable costs. Even so, the decision must be made as to whether the item is to be a one use unit or one that may be used many times. In addition, it is almost necessary that the plastic be heat sealable although there are adhesives which do a remarkably good job. It does without saying that the plastic must be compatable with sunlight and stable over a range of temperatures. In addition, the material must be waterproof and generally air-tight.

In view of the foregoing it is an object of this invention to provide a plant tunnel which is adapted to allow the requisite sunlight and associated heat to pass therethrough in a manner responsive to the plants to be grown thereunder.

It is yet another object of this invention to provide a plastic plant tunnel which is heat sealable and impervious to air and water.

It is a still further object of this invention to provide a plant tunnel as set forth in the previous objects which is simple to manufacture and set up in the field and yet be inexpensive so as to make the users thereof at least evenly competitive in the open market.

The foregoing and additional objects and advantages will become more apparent when taken in conjunction with the following detailed description and drawings showing by way of example a preferred embodiment of this invention.

IN THE DRAWINGS

Figure 1:
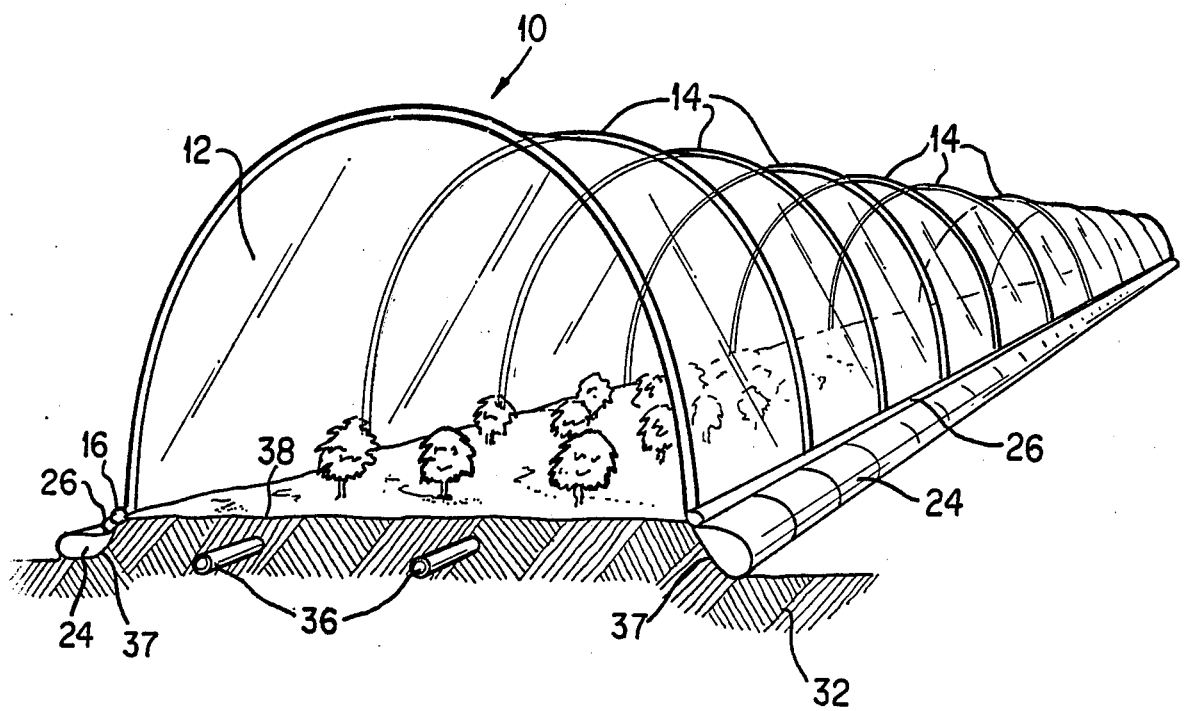
FIG. 1 is a perspective view of the tunnel system of this invention illustrating the manner in which the tunnel is constructed and adapted to cooperate with the planted soil.

As illustrated in the three figures of the drawings, the plant tunnel 10 comprises a longitudinally extending cover 12 of some what semi-circular crosssection made of plastic which is heat sealable and generally transparent or translucent to allow the desired light to pass therethrough. At spaced intervals along the length of the tunnel the cover 12 is provided with a plurality of air ribs 14 which are generally coextensive with the semi-circular cross section of the cover 12. In fact, one method of manufacturing the plant tunnel includes the making of the air ribs 14 and the cover 12 from a single sheet of plastic so that the air ribs 14 will be integral with the cover 12.

Air is furnished to air ribs 14 by means of longitudinally extending air channel 16 which is tubular and provided with openings 18 by which air channel 16 is fluidly connected to the air ribs 14. Here again it is planned to make the air channel 16 integral with the cover 12. A connector 20 is affixed to one end of air channel 16 to receive pressurized air from any suitable source. If necessary a pressure regulator may be incorporated in connector 20 to assure an accurate air pressure to maintain the tunnel is desired upright position.

In order to retain the tunnel in position each longitudinal side of the cover 12 is provided with a ballast assembly 22 generally coextensive in length with the cover 12 and comprising a plurality of separate ballast chambers 24 connected to a longitudinally extending ballast channel 26 having openings 28 feeding water to said ballast chamber 24. Each ballast channel 26 is provided with a water inlet connector 30 to control flow water into channels 26.

It has also been suggested that the ballast assemblies 22 could be made separately and then attached to the cover 12 in any suitable manner.

Figure 2:
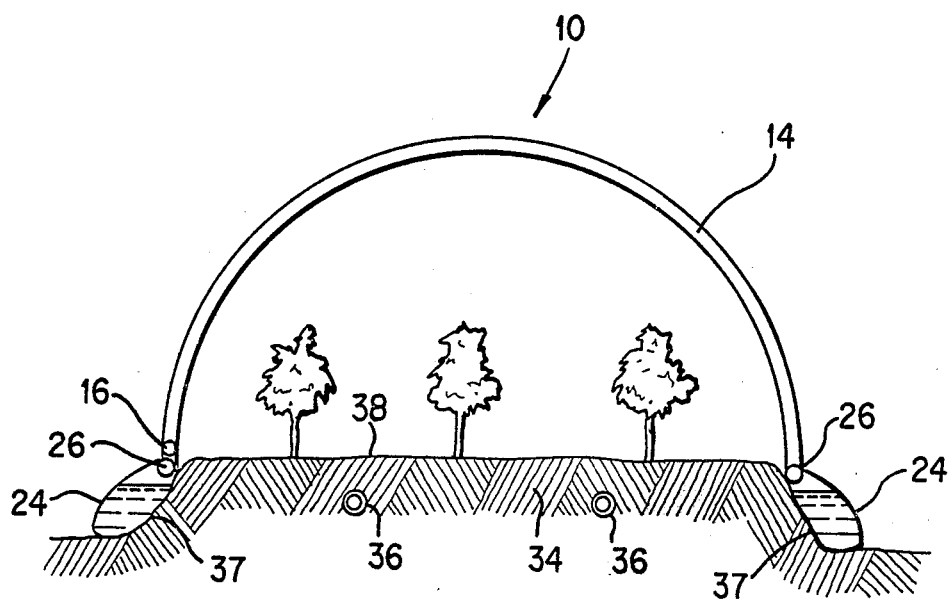
FIG. 2 is an end elevational view of the plant tunnel of FIG. 1 showing additional details of construction.
Figure 3:
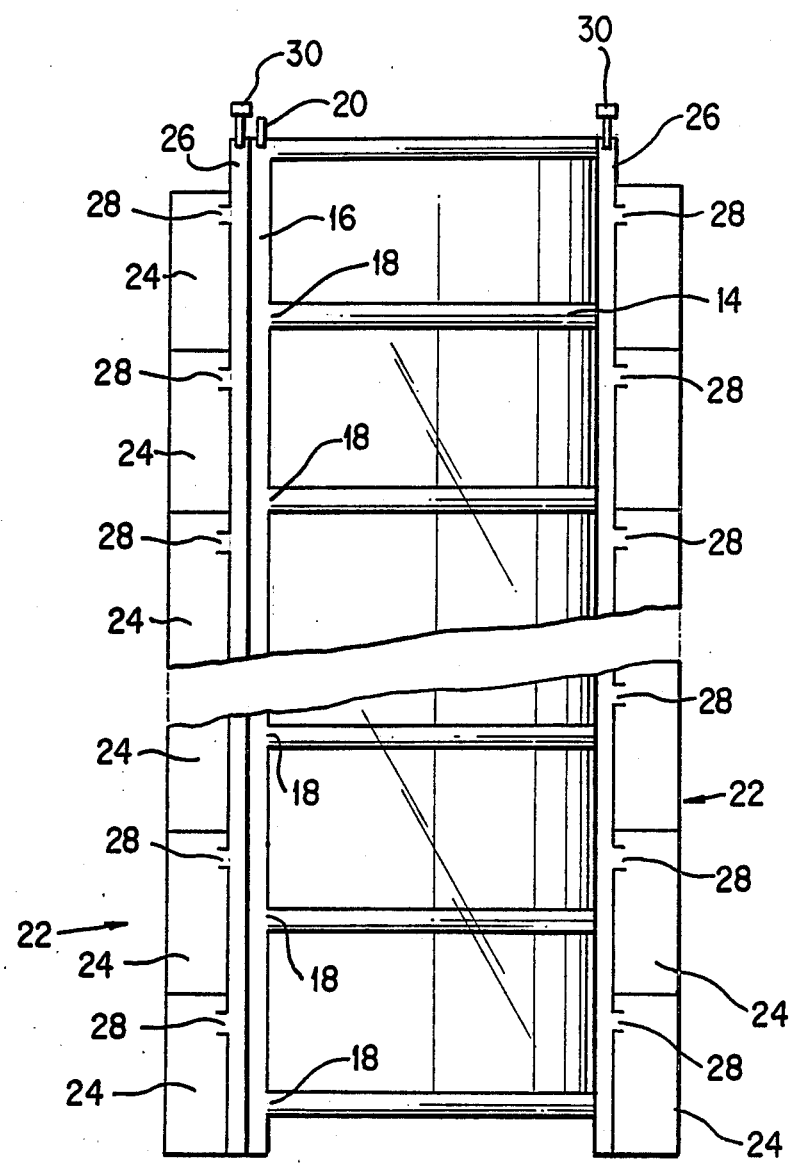
FIG. 3 is a top plan view of the erected tunnel showing the specific arrangement of the water ballast compartments and the air supply channels with connecting transverse supporting air ribs.

One specific use of the tunnel system 10 is shown in FIGS. 1 and 2 wherein the soil 32 is formed in an elevated row 34 and provided with watering pipes 36. A matching film 38 may be applied to the upper surface of the elevated row 34. After the desired planting has been done in the elevated row 34 the tunnel assembly 10 in deflated condition is positioned over the elevated row 34 so that the ballast assemblies 22 will lie on each side 37 of the elevated row 34. Next water is introduced through connector 30 to fill the individual ballast chamber 24 to the level indicated in FIG. 2. With the tunnel assembly so held in position air is introduced through connector 20 to inflate the air ribs 14 and thereby erect the tunnel assembly in the manner illustrated in FIGS. 1 and 2. It should be noted that the use of integral air ribs 14 greatly increases durability since there is no chaffing such as would be produced by relative movement between individual separate supports and the cover carried thereby. In addition, a somewhat reduced pressure may be used this providing greater flexibility which will greatly reduced potential tearing problems occassioned by excessive external forces of wind and rain.

There are several very interesting features of the tunnel construction as described above. For example, the concept of having the air ribs 14 integral with the cover 12 provides a tremendous advantage when assemblying the tunnel system because all that is required is the introduction of pressurized air into the air channel 16 which then feeds air into all air ribs to thereby erect the assembly. There is no need for any adjustments between cover 12 and air ribs 14 because the arrangement is integral and all spacing is preset. In addition, it is possible that it might be desirable to make the water ballast assembly of somewhat heavier weight than that of the cover and to make it removable from the remainder of the tunnel assembly so that the water ballast assemblies would be used again independent of the remaining tunnel assembly.

What I claim is:

1. An air supported tunnel system for protecting soil rows of planted items by providing a cover thereover, said tunnel system comprising a one piece tunnel cover adapted to extend over a longitudinally extending soil row, said cover being formed from a single sheet of plastic material and defining a tunnel of generally semicircular cross section, a pluality of longitudinally spaced air ribs formed in and constituting a part of said cover and extending from end to end of th cross section of the cover to act as tunnel supports when inflated, an air channel connected to the tunnel cover along one side thereof, said air channel being in fluid communication with each air rib whereby pressurized air may be supplied through said air channel to inflate the air ribs to maintain the tunnel system in erected condition; a water ballast assembly connected to each longitudinal side of the tunnel cover independent from the air channel, said water ballast assembly comprising a water channel connected to the longitudinal side of the cover, a plurality of ballast chambers in fluid communication with each water channel whereby water may be fed through the water channel into each ballast chamber so as to maintain the tunnel cover in place over the row of planted items.

2. The invention as set forth in claim 1 and wherein the ballast chambers are made of flexible water impervious material so that the ballast chambers will fit smoothly on the area adjacent the soil row.

3. The invention as set forth in claim 2 and wherein the length of the entire group of ballast chambers is generally coextensive with the length of the tunnel cover whereby no appreciable air will be able to edge in under said ballast chamber to affect the erected position of the tunnel cover.

4. The invention as set forth in claim 1 and wherein the water ballast assemblies connected to each side of the tunnel cover are removable therefrom for use again.

5. The invention as set forth in claim 1 and wherein the cover and the air ribs together with the air channel are made from heat sealable plastic.

* * * * *